United States Patent [19]

Fukuda et al.

[11] 4,315,041

[45] Feb. 9, 1982

[54] EMULSIFIER COMPOSITION AND QUALITY IMPROVEMENT METHOD FOR STARCH CONTAINING FOOD

[75] Inventors: Tetsuro Fukuda, Hirakata; Hideo Matsuura, Toyonaka; Yoshihito Koizumi, Makado; Takeshi Yamaguchi, Chiba, all of Japan

[73] Assignee: Riken Vitamine Oil Co., Ltd., Tokyo, Japan

[21] Appl. No.: 108,145

[22] Filed: Dec. 28, 1979

[30] Foreign Application Priority Data

Nov. 19, 1979 [JP] Japan .................................. 54-149770
Dec. 7, 1979 [JP] Japan .................................. 54-159616

[51] Int. Cl.³ ............................................. A21D 2/16
[52] U.S. Cl. ................................... 426/653; 426/654; 426/601
[58] Field of Search ................ 426/654, 653, 554, 601; 252/356

[56] References Cited

U.S. PATENT DOCUMENTS

| | | | |
|---|---|---|---|
| 2,978,329 | 4/1961 | Cochran et al. | 252/351 |
| 3,124,464 | 3/1964 | Knightly et al. | 426/654 X |
| 3,379,535 | 4/1968 | Landfried et al. | 426/654 X |
| 3,388,999 | 6/1968 | Kuhrt et al. | 426/653 |
| 3,443,965 | 5/1969 | Birnbaum | 426/654 |
| 3,502,482 | 3/1970 | Birnbaum | 426/654 |
| 3,752,770 | 8/1973 | Buddemeyer | 426/654 X |
| 3,995,069 | 11/1976 | Harries | 426/654 X |
| 4,178,393 | 12/1979 | Gregersen | 426/653 |
| 4,229,480 | 10/1980 | Suggs et al. | 426/654 X |

OTHER PUBLICATIONS

Kuhrt, N. H. et al., Conjoined Crystals I, Composition and Physical Properties, Jour. Amer. Oil Chem. 40, (1963), pp. 725–730.

Kuhrt, N. H. et al., Conjoined Crystals II, Applications, Jour. Amer. Oil Chem. 40, (1963), pp. 730–733.

*Primary Examiner*—Robert A. Yoncoskie
*Attorney, Agent, or Firm*—Armstrong, Nikaido, Marmelstein & Kubovcik

[57] ABSTRACT

An emulsifier composition for use in starch-containing foods which is prepared by melt-mixing a composition which is composed of specific ratios of saturated fatty acid monoglyceride unsaturated fatty acid monoglyceride, and fat; powdering the resultant mixture and thereafter tempering the powdered composition.

4 Claims, 1 Drawing Figure

0

EMULSIFIER COMPOSITION AND QUALITY IMPROVEMENT METHOD FOR STARCH CONTAINING FOOD

BACKGROUND OF THE INVENTION

This invention relates to a novel emulsifier composition which exerts excellent improvement effects to starch containing food.

Due to its function and safety, mono- or diglyceride is widely used as emulsifier in the present food processing industry, and its function differs depending on the purity, appearance, physical and chemical properties, and the types of fatty acid that constitute the emulsifier.

In the case of starch containing food, such emulsifiers are required to react well, particularly with starch, to obtain a complex with the starch. Saturated fatty acid monoglyceride having 14 to 18 carbon atoms and of a high purity distilled monoglyceride is known to meet this requirement.

In the case of using mono- and diglyceride in the fat phase, there is no restriction on the physical properties of the mono- and diglyceride because they can be dissolved into fat. However, in case of starch-containing food, it is desirable to use mono- and diglyceride in the aqueous phase in order to obtain a starch-complexing improvement effect.

In these circumstances or where the emulsifier is mixed with the raw material in powdered form, physical appearance, physical and chemical properties and surface condition have a significant bearing on this function.

Monoglyceride is known to be polymorphic and is classified according to sub-$\alpha$, $\alpha$, $\beta$ and $\beta'$-crystalline forms which are arranged in order of increasing melting points. The $\beta$-crystalline form is the most stable thermodynamically and monoglyceride has always been marketed in the $\beta$-crystalline form.

The reason why the $\alpha$-crystalline form is more effective in the aqueous phase can be assumed to be because of a difference in hydrophilicity. As a means of obtaining the $\alpha$-crystalline form, there is a so-called conjoined crystal method employing the combined use of saturated fatty acid monoglyceride and fatty acid propyleneglycol ester (J. Am. Oil., Chem. 40, 725, (1963)); or a method wherein a dispersion in water is formed at a temperature below the melting point of monoglyceride. However, each of these methods have disadvantages, such as a small content of monoglyceride, difficulty in temperature control or in preservation properties.

From these standpoints, it would be advantageous to obtain a monoglyceride having the stable $\beta$-crystalline form while, at the same time, exhibiting good functional properties. Various methods have been considered as means for improving the hydrophilic properties. In order to increase the surface area of crystals, there is a method whereby minute crystals were obtained by recrystallization using a solvent (Patent: TOKU-KOSHO No. 50-34613) and a method whereby an aqueous dispersion of the $\beta$-crystalline form was obtained by adding a stabilizer into a dispersion or a method whereby a dry powdered monoglyceride was obtained by adding binders into a dispersion (Patent TOKU-KO-SHO No. 44-26900).

Each of these methods have excellent improvement effects. However, with respect to obtaining powdered monoglyceride, the methods were disadvantageous because they tended to be expensive from the standpoint of production efficiency, and a product in paste form proved to be inferior in handling, preservation and stability. Therefore, the development of a more simplified process has long been desired for obtaining a powdered monoglyceride which is effective in the aqueous phase. As a result of intensive research work in consideration of these shortcomings, the present inventors discovered a novel emulsifier composition which provides good quality improvement effects to starch containing food, and which is easier to handle, less expensive, withstands longer preservation time and is stable. This prior invention, of which the present invention is an improvement, is described in co-pending application Ser. No. 107,914.

As described in their copending application, the present inventors discovered that the expected purpose could be achieved by powdering an emulsifier composition comprising a high purity distilled monoglyceride composed of 65–85% of saturated fatty acid monoglyceride and 35–15% of unsaturated fatty acid monoglyceride, and having an iodine value of 10–40, and tempering the powdered composition for more than 30 minutes at a temperature of more than 45° C. and which does not cause melting of the composition. In the composition, the number of carbon atoms for the saturated fatty acid is in the range of 12–22, and that for the unsaturated fatty acid is in the range of 16–22.

The composition can be produced either by using a fatty acid material (i.e., fat and oil) which fulfills the above requirements, or by using 2 or more different kinds of fatty acid monoglycerides.

If the amount of unsaturated fatty acid monoglyceride is less than 15% and the iodine value is less than 10, the expected results are not obtained. Likewise, if the amount is more than 35% and the iodine value is more than 40, the complex-forming ability with starch is deteriorated and, at the same time, it is difficult to obtain the composition in powdered form.

It was found that, by tempering the emulsifier composition thus obtained for more than 30 minutes at a temperature which is within the range of from more than 45° C. to a temperature which does not melt the composition, the properties of the composition are improved drastically and the preservation stability is also improved. If the tempering temperature is below 45° C., it takes longer to attain the required properties and the crystal sizes become coarse. Therefore, a lower temperature cannot satisfy both the production and expected property requirements.

When fatty acid monoglyceride is solidified by cooling, it forms the stable $\beta$-crystalline form after undergoing successive crystal formation, from each of. sub-$\alpha$, $\alpha$ and $\beta'$ forms. But as the transition time becomes longer, the crystals thus obtained become coarser. Therefore, it is necessary to finish the transition as rapidly as possible in order to obtain minutely sized crystals in order to meet the purpose of the invention. The most effective method is to use solvent. The use of a solvent such as water or alcohol had already been proposed and reduced to practice at present.

However, as indicated earlier, problems lay in handling and preservation stability.

The inventors discovered that, from these standpoints, monoglyceride having unsaturated fatty acids with cis coordination in its double bond position suited the purpose of the invention.

As indicated earlier, the suitable percentages of saturated fatty acid monoglyceride and of unsaturated fatty acid monoglyceride are 65–85% for the former and 35–15% for the latter. From the standpoint of complex forming ability with starch, it is more advantageous to have as high a content of saturated fatty monoglyceride as possible in the mix for the improvement of functional properties.

Depending on the types of fatty acids, fatty acid monoglyceride has different polymorphic melting points. But, for a difference in number of carbon atoms within 4, it forms a solid solution. Therefore, it can be handled behaviorally as one fatty acid monoglyceride.

As the first stage in the production of the composition, the mix-melted fatty acid monoglyceride is cooled to a temperature below the sub-α crystal melting point and, more desirably, to below 35° C. in normal cases. In this instance, unsaturated fatty acid monoglyceride, which is a minor constituent, can be solidified among crystals of saturated fatty acid monoglyceride. The second stage of production is a crystal transition stage produced by tempering. The tempering temperature is deisred to be above the crystal melting point of sub-α or α crystalline forms of saturated fatty acid monoglyceride, which is in a solid solution stage. This tempering process melts unsaturated fatty acid monoglyceride and saturated fatty acid monoglyceride crystallizes in a minute form and stabilizes. In this case, the appropriate degree of tempering and the solvent effect of the unsaturated fatty acid monoglyceride accelerate the transition of crystal to β-crystalline form. Normal tempering is 2–8 days at 45° C. and 30 minutes to one day at 50°–55° C.

The third stage of the process is cooling of the tempered monoglyceride. The product obtained has excellent properties and is stable for a long period of time.

Among the compositions disclosed in the above-described invention, fatty acid monoglyceride, which is composed of cis type unsaturated fatty acids is, on one hand, a good solvent and is compatible with saturated fatty acid monoglyceride, but the compatibility is not high and does not inhibit crystallization at a low temperature. On the other hand, it is largely hydrophilic even at a low temperature. Therefore, among saturated fatty acid monoglyceride, unsaturated fatty acid monoglyceride, when added with water, serves as a disintegrator and disperses saturated fatty acid monoglyceride in the aqueous phase. Monoglyceride which is composed of trans type unsaturated fatty acids is, due to its structure, largely compatible with saturated fatty acid monoglyceride and is believed to form a condition which is close to the solid solution state and its melting point is high. Therefore, this cannot be treated in the same manner as that of the cis type.

Furthermore, the purpose of the above-described invention is fulfilled to a large degree by the combined use of the substances described below. I.e., an emulsifier composition having good properties can be obtained by powdering a composition which is composed of the said monoglyceride composition mix-melted with less than 5% of a member selected from the group consisting of alcohols, organic acids, lecithin and stearoyl lacrylate which are compatible with fatty acid monoglyceride and by tempering or not tempering for more than 30 minutes at a temperature which is more than 45° C., but which does not melt the said composition.

The additional substance, as a result of acting thermodynamically, helps to refine crystals of saturated fatty acid monoglyceride and to form a thin film of unsaturated fatty acid monoglyceride so that it can fulfill the purpose of the invention without tempering. Tempering also serves to improve the properties.

Alcohols which can be used include propylene glycol and glycerol. Organic acids can be selected from citric acid, malic acid, fumaric acid, succinic acid, glutamic acid, tartaric acid and lactic acid. Soy bean lecithin and egg yolk lecithin can be used as lecithin and lactylic stearate, sodium stearoyl-2-lactylate and calcium stearoyl-2-lactylate can be used as the stearoyl lactylate.

The emulsifier composition thus obtained exerts prominent effects. But, since the product is made structurally of saturated fatty acid monoglyceride, the crystal surface of which is surrounded by a thin film of unsaturated fatty acid monoglyceride, there sometimes arises problems such as caking or stickiness which develops on the surface of handling equipment under preservation and distribution environments at certain temperatures.

In order to overcome these shortcomings and as a result of devoted research work, the present inventors discovered a way to solve these problems by including, in the emulsifier composition described above and prepared according to the description of the co-pending application, 5–20% of fat that has a melting point which is more than the tempering temperature of the monoglyceride composition.

DESCRIPTION OF THE INVENTION

In a composition which is composed of saturated fatty acid monoglyceride and unsaturated fatty acid monoglyceride, the fat does not form a solid solution with the former, and forms monotectic crystal so that crystallization stabilizing is accelerated. The fat dissolves into the latter to a lesser degree and the crystallizing of the fat is accelerated by the solvent effect of the latter.

In a powdering process, for instance, in spray cooling, air, carbon dioxide gas or nitrogen gas can be used as the cooling environment. Under these atmospheres, the fat has a lower polarity than the fatty acid monoglyceride, segregates on the surface of particles and crystallizes rapidly. The powder thus obtained has a rather thick surface density, is less hygroscopic and has higher fluidity. In comparison to the composition made only of fatty acid monoglyceride it has excellent acceptance to production process, packaging and has excellent preservation stability causing no problems in distribution channels.

The addition of the fat is limited to 20%. The further addition deteriorates the performance and lessens the emulsifier contas compared to the composition composed only of fatty acid monoglyceride.

In food processing, it is normal that certain degree of force is applied. But this is no problem. The powdering process of this invention can be accomplished in any conventional manner. But it is efficient to melt the emulsifier composition followed by powdering of the composition by means of spray cooling.

As to the grain, or particle, size of powder, the particle distribution is desired to be 42–80 mesh as the medium diameter of grains. Functional properties deteriorate as the particle size becomes coarse and the ease of handling deteriorates as the particle size become finer. A small variation of particle size from the optimum range is not harmful.

The emulsifier composition of the present invention is obtained by tempering the powdered composition for more than 30 minutes at a temperature above 45° C. but which does not melt the powdered composition.

It is known from the result of measurement by X-ray defraction analysis and differential thermal analysis that the types of crystals of fatty acid monoglyceride contained in the emulsifier composition obtained by this invention are $\beta$-crystal for the most part and $\beta'$-crystal as a minor part. Therefore, as indicated earlier, the reason for excellent stability of properties during storage can be well understood.

The emulsifier composition of this invention can be used merely by mixing with water or with a powder which is a food processing material. This makes it easier to handle.

Since the advantages of the properties of the emulsifier composition disclosed according to this invention can be exerted principally by forming a complex with starch, its performance can be evaluated by Blue Value (hereinafter abbreviated as BV). BV can be obtained by utilizing the reaction of iodine and starch. When the starch forms a complex with fatty acid monoglyceride, the color of starch is disturbed by iodine. Accordingly, the degree of complex formation, in other words, functional properties of the emulsifier composition can be evaluated by measurement of BV using spectrophotometry analysis. Therefore, the lower the BV, the more complex forming ability, indicating the excellence of the functional properties.

BV of less than 0.300 as indicated in the embodiments is adequate for actual application.

The emulsifier composition disclosed under this invention is capable of improving the quality of starch containing food by being added directly to the starch containing food or to the mix. This composition exerts excellent quality improvement effect in making bread, pastries, pan cake, noodles, cookies, food made from fish and livestock and the said mix. Since it exerts excellent quality improvement effects by mixing with water, comparable effects were recognized in fat and water based foods or in protein containing foods.

Not only limited to use in the aqueous phase, this composition can be used in fat phase.

Figure 1:
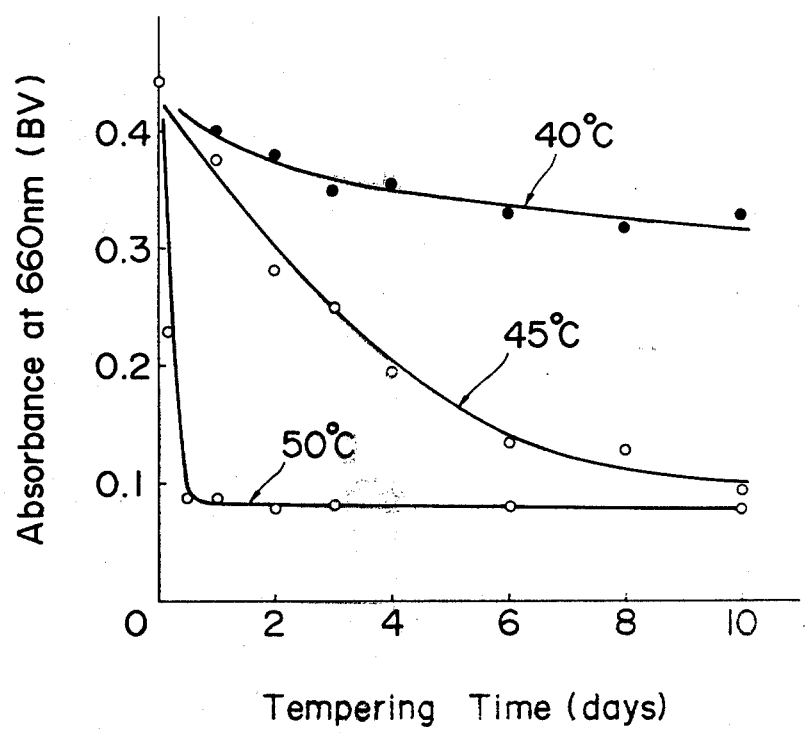
FIG. 1 shows a change of BV with lapse of time by tempering the composition of this invention during its preparation.

The following are the embodiments of this invention.

COMPARATIVE EXAMPLE 1

A mixture of equivalent amounts of refined palm oil distilled monoglyceride and fully hardened palm oil distilled monoglyceride were melted and after spray-cooling, a powder with a medium size of 60 mesh were obtained. These were immediately placed into a tempering room at a temperature of 50° C. and discharged from the tempering room after a lapse of one hour and the temperature of the powder was lowered to room temperature. Thus the product was obtained. The component of fatty acid, iodine value and BV are indicated in Table 1. These figures show excellent performance values in comparison to fatty acid monoglyceride for bread mix and which was composed of untempered material and commercially available hardened oil fatty acid monoglyceride (conventional example).

COMPARATIVE EXAMPLE 2

Distilled monoglyceride (iodine value of 22) which had been produced from slightly hardened palm oil (iodine value of 30) was powdered in a similar manner as indicated in Comparative Example 1 and tempered for 4 days at 45° C. and the temperature thereof was lowered to room temperature to obtain the product. The test results of the product are indicated in Table 1. The product stability test results are indicated in Table 2.

COMPARATIVE EXAMPLE 3

The product was made by the method indicated in comparative Example 1 from the melt mix made of 75 weight % of fully hardened soybean oil distilled monoglyceride and 25 weight % of olive oil distilled monoglyceride. The test results of this product are indicated in Tables 1 and 2.

TABLE 1

| Experimental No. | Analysis properties Testing material | Composition of fatty acid (%) | | | | Iodine value | B.V. |
|---|---|---|---|---|---|---|---|
| | | $C_{16}$ | $C_{18}$ | $C_{18'}$ | $C_{18''}$ | | |
| 1 | Composition cited in Comparative Example 1 | 48 | 28 | 17 | 4 | 20 | 0.100 |
| 2 | Non tempered product of above | Same as above | | | | | 0.340 |
| 3 | Composition cited in Comparative Example 2 | 64 | 6 | 25 | 3 | 22 | 0.080 |
| 4 | Non tempered product of above | Same as above | | | | | 0.320 |
| 5 | Composition cited in Comparative Example 3 | 11 | 65 | 20 | 2 | 17 | 0.100 |
| 6 | Non tempered product of above | Same as above | | | | | 0.420 |
| 7 | Commercially* available composition for bread making | 33 | 64 | t | — | 0.3 | 0.140 |
| 8 | Blank | | | | | | 0.780 |

*Commercially available Emulsy-MM-100 (manufactured by Riken Vitamin), including 80% of monoglyceride, in powder form.

Test Method by B.V.: Test material of 0.02 g was added to 40 ml of 0.5% starch solution at 32° C. and placed still after shaking. 1 ml of 0.02 N iodine solution was added to 2.5 ml of the starch solution and the resultant solution was blended well by shaking. Then this solution was diluted with distilled water up to 100 ml.

Absorbance was measured by spectrophotometry at a wavelength of 660 nm after filtering. The temperature of liquid was kept at 32° C. when handling.

TABLE 2

| Experimental No. | Testing material | Properties Stabilities (B.V.) Number of lapsed days | | | |
|---|---|---|---|---|---|
| | | 2 | 30 | 60 | 180 |
| 9 | Composition cited in Comparative Example 2 | 0.075 | 0.080 | 0.080 | 0.085 |
| 10 | Composition cited in Comparative Example 3 | 0.090 | 0.100 | 0.100 | 0.110 |

Preservation condition: In a room temperature of 25–30° C.

COMPARATIVE EXAMPLE 4

The product was obtained by treating various combinations of melt mixtures of fully hardened soybean oil distilled monoglyceride and olive oil distilled monoglyceride in a manner described in Comparative Example 2.

On the other hand, an aqueous dispersion of fully hardened soybean oil distilled monoglyceride was prepared and likewise its properties were also compared. The results are indicated in Table 3.

TABLE 3

Composition of Fatty Acids, Iodine Value and Properties Tests (BV)

| Experimental No. | Saturated fatty acid monoglyceride | Unsaturated fatty acid monoglyceride | Properties evaluation Iodine value | BV |
|---|---|---|---|---|
| 11 | 90/10 | | 9.8 | 0.370 |
| 12 | 85/15 | | 15.4 | 0.200 |
| 13 | 80/20 | | 20.6 | 0.150 |
| 14 | 75/25 | | 25.9 | 0.065 |
| 15 | 70/30 | | 31.1 | 0.085 |
| 16 | 65/35 | | 35.8 | 0.090 |
| 17 | 100/0 Aqueous Dispersion | | — | 0.085 |
| 18 | Blank | | — | 0.745 |

Note: Composition of fatty acid %

| | $C_{16}$ | $C_{18}$ | $C_{18'}$ | $C_{18''}$ |
|---|---|---|---|---|
| Fully hardened soybean oil distilled monoglyceride | 20 | 80 | | |
| Olive oil distilled monoglyceride | 6 | 4 | 83 | 7 |

It became difficult to powder in case the unsaturated fatty acid monoglyceride content became more than 35%. The most desirable combinations were from 85/15–70/30.

From these results, the optimum combinations of fatty acid monoglyceride and iodine value were discovered.

COMPARATIVE EXAMPLE 5

Fully hardened palm oil distilled monoglyceride and refined palm oil distilled monoglyceride were melted (the mix ratio of saturated fatty acid versus unsaturated fatty acid=76.5:23.5) and powdered in a manner mentioned in Comparative Example 1, and tempered at temperatures of 40° C., 45° C. and 50° C. Blue Value was used to measure the secular change of properties. Iodine value of this composition was 23. The results are indicated in FIG. 1.

From the test results, an improvement effect was not discovered at a tempering temperature of 40° C. With a tempering temperature of 45° C., an improvement effect was observed after 2–8 days and at 50° C., a drastic improvement effect was recognized after 30 minutes–2 hours.

COMPARATIVE EXAMPLE 6

Citric acid, calcium stearoyl-2-lactylate, lecithin and propylene glycol were added to the composition of comparative Example 1 and melted, powdered in a manner mentioned in comparative Example 1; and tempered for 2 days at 45° C. in order to obtain a product. The results are indicated in Table 4.

TABLE 4

Effects of Various Substances Added (BV readings)

| | | Tempering | | | |
|---|---|---|---|---|---|
| | | Yes | | No | |
| Experimental No. | Preservation time Additive | A At time of preparation | B 3 months | C At time of preparation | D 3 months |
| 19 | nil | 0.100 | 0.110 | 0.360 | 0.380 |
| 20 | 1% citric acid | 0.075 | 0.080 | 0.250 | 0.260 |
| 21 | *CSL 3% | 0.080 | 0.080 | 0.180 | 0.185 |
| 22 | Lecithin 2% | 0.095 | 0.105 | 0.280 | 0.295 |
| 23 | Propylene glycol 2% | 0.080 | 0.090 | 0.250 | 0.275 |
| 24 | 1% citric acid 2% lecithin 2% propylene glycol | 0.050 | 0.055 | 0.160 | 0.160 |

*Abbreviation of calcium stearoyl-2-lactylate

Additions of citric acid and CSL showed fairly favorable results even without tempering.

EMBODIMENT EXAMPLE 1

Fixed amounts of fully hardened beef tallow (melting point: 61° C.) was mix-melted with each of products mentioned in Experimental No. 13 and No. 15 of Comparative Example 4, and with a product obtained in Experimental No. 24 of comparative Example 6, and were sprayed under a normal temperature and powdered (Product temperature: 30°–34° C.). The temperature of products thus obtained rose to 47°–53° C. by the generated heat automatically under static condition. Following this, the products were tempered for 30 minutes at 50° C., and cooled to normal temperature. After sieving, 10 kgs. each of products were packed in a carton box with an inner polyethylene bag and underwent, repeatedly, temperature cycles of 35° C., to room temperature (23° C.) on a daily basis for 2 weeks. Observation was made on the products after this period.

The results are indicated in Table 5.

TABLE 5

Effect of Fats Added

| Experimental No. | Basic recipe | Mix ratio of fats | BV | Caking condition | Evaluation |
|---|---|---|---|---|---|
| 25 | Example 4 No. 13 | 0 | 0.150 | Caking occurred in fairly round condition | 2 |
| 26 | | 3 | 0.180 | Slight caking occurred very fragile | 3 |
| 27 | | 5 | 0.200 | Favorable fluidity | 5 |
| 28 | | 10 | 0.250 | Favorable fluidity | 5 |
| 29 | | 15 | 0.310 | Favorable fluidity | 5 |
| 30 | | 20 | 0.380 | Favorable fluidity | 5 |

TABLE 5-continued

Effect of Fats Added

| Experimental No. | Basic recipe | Mix ratio of fats | BV | Caking condition | Evaluation |
|---|---|---|---|---|---|
| 31 | Example 4 | 3 | 0.120 | Solid caking | 1 |
| 32 | No. 15 | 5 | 0.195 | Localized caking, but very fragile | 3 |
| 33 | | 10 | 0.235 | Fluidity | 5 |
| 34 | | 15 | 0.280 | Favorable fluidity | 5 |
| 35 | | 20 | 0.330 | Favorable fluidity | 5 |
| 36 | Example 6 | 3 | 0.080 | Solid caking | 1 |
| 37 | No. 24 | 5 | 0.120 | Fluidity witnessed | 4 |
| 38 | | 10 | 0.180 | Favorable fluidity | 5 |
| 39 | | 15 | 0.245 | Favorable fluidity | 5 |
| 40 | | 20 | 0.290 | Favorable fluidity | 5 |

Note:
Evaluation was conducted on a 5-point basis. 5:favorable-1:unfavorable (caking)

From this observation, it was learned that the addition of more than 5% of fats could inhibit caking.

EMBODIMENT EXAMPLE 2

Breadmaking experiments were conducted on test products obtained from Experimental No. 11, No. 13 and No. 15 of Comparative Example 4, and Experimental No. 28, No. 34 and No. 38 of Embodiment Example No. 1. Breadmaking tests and dough tests were performed in accordance with the following methods.

Breadmaking test method: By sponge-dough method (AACC method). The addition of emulsifier composition (as emulsifier) to wheat flour was 0.4%. The dough test was done by sensory inspection. Baked bread was left at 20° C. and the degree of aging retardation was measured.

Aging retardation test methods: 5 test specimens of 5 cm square and 1.3 cm in thickness were taken from the central portion of the bread and were measured by a Texturometer (manufactured by General Foods) (plunger: 5 cm in diameter, 10 flat dish, clearance: 5 mm, low speed electric voltage: 2 V).

The results are indicated in Table 6.

TABLE 6

Bread Making Test Results

| Test specimens | | Dough test | Aging retardation effects (kg/10 mm) | | |
|---|---|---|---|---|---|
| | | | 1st day | 2nd day | 3rd day |
| Comparative Example 4 | No. 11 comparison | Δ | 0.93 | 1.36 | 1.48 |
| | No. 13 comparison | o | 0.78 | 1.13 | 1.31 |
| | No. 15 comparison | o | 0.80 | 1.18 | 1.33 |
| Embodiment Example 1 | No. 28 (invented specimen) | o | 0.81 | 1.20 | 1.30 |
| | No. 34 (invented specimen) | o | 0.80 | 1.10 | 1.24 |
| | No. 38 (invented specimen) | o | 0.81 | 1.15 | 1.28 |
| Blank | | x | 1.08 | 1.55 | 1.65 |
| Commercially available* emulsifier (for comparison) | | o | 0.76 | 1.16 | 1.27 |

*Identical to Experimental No. 7 specimen.

It was concluded that the invented composition had excelled in both dough tests and aging retardation effects.

EMBODIMENT EXAMPLE 3

Fixed amounts of fully hardened beef tallow (melting point: 61° C.) was mix-melted with the composition containing citric acid, calcium stearoyl-2-lactylate, soy lecithin and propyleneglycol in Comparative Example 1 and powdered in a manner mentioned in Comparative Example 1 and tempered for 30 minutes at 50° C., and cooled to normal temperature.

After sieving, 10 kgs, each, of products were packed in a carton box with inner polyethylene bag and underwent repeatedly temperature cycles of 35° C., to room temperature (23° C.) on a daily basis for 2 weeks. Observation was made on the products after this period. The results are indicated in Table 7.

TABLE 7

Effect of Fat Added

| Experimental No. | Additive | Mix ratio of fat | BV value | Caking condition | Evaluation |
|---|---|---|---|---|---|
| C.E. 41 | | 0 | 0.100 | Caking occurred in round condition | 1 |
| " 42 | Citric acid 1% | 0 | 0.075 | Caking occurred in fairly round condition | 2 |
| " 43 | Citric acid 1% | 3 | 0.101 | Slightly caking occurred | 3 |
| E.E. 44 | Citric acid 1% | 5 | 0.130 | Favorable fluidity | 5 |
| E.E. 45 | Citric acid 1% | 10 | 0.190 | Favorable fluidity | 5 |
| " 46 | Citric acid 1% | 15 | 0.260 | Favorable fluidity | 5 |
| " 47 | Citric acid 1% | 20 | 0.310 | Favorable fluidity | 5 |
| C.E. 48 | CSL* 3% | 0 | 0.080 | Caking occurred in fairly round condition | 2 |
| " 49 | " | 3 | 0.110 | Slightly caking occurred very fragile | 3 |
| E.E. 50 | " | 5 | 0.150 | Favorable fluidity | 5 |
| " 51 | " | 10 | 0.200 | Favorable fluidity | 5 |

TABLE 7-continued

| | Experimental No. | Additive | Effect of Fat Added | | Caking condition | Evaluation |
|---|---|---|---|---|---|---|
| | | | Mix ratio of fat | BV value | | |
| " | 52 | " | 15 | 0.270 | Favorable fluidity | 5 |
| " | 53 | " | 20 | 0.330 | Favorable fluidity | 5 |
| C.E. | 54 | Lecithin | 0 | 0.095 | Caking occurred in round condition | 1 |
| " | 55 | " | 3 | 0.120 | Slightly caking occurred | 2 |
| E.E. | 56 | " | 5 | 0.160 | Slight fluidity | 5 |
| " | 57 | " | 10 | 0.220 | Favorable fluidity | 5 |
| " | 58 | " | 15 | 0.280 | Favorable fluidity | 5 |
| " | 59 | " | 20 | 0.330 | Favorable fluidity | 5 |
| C.E. | 60 | Propylene glycol 2% | 0 | 0.080 | Caking occurred in round condition | 1 |
| " | 61 | Citric acid 1% Lecithin 2% Propylene glycol 2% | 0 | 0.050 | Caking occurred in round condition | 1 |
| " | 62 | Citric acid 1% Lecithin 2% Propylene glycol 2% | 3 | 0.080 | Slightly caking occurred | 2 |
| E.E. | 63 | Citric acid 1% Lecithin 2% Propylene glycol 2% | 5 | 0.120 | Slight fluidity | 5 |
| " | 64 | Citric acid 1% Lecithin 2% Propylene glycol 2% | 10 | 0.180 | Favorable fluidity | 5 |
| " | 65 | Citric acid 1% Lecithin 2% Propylene glycol 2% | 15 | 0.245 | Favorable fluidity | 5 |
| " | 66 | Citric acid 1% Lecithin 2% Propylene glycol 2% | 20 | 0.290 | Favorable fluidity | 5 |

C.E. Comparative Example
E.E. Embodiment Example

EMBODIMENT EXAMPLE 4

Bread making experiments were conducted on test products obtained from experimental No. 41, No. 42, No. 43, No. 58 and No. 64 of Embodiment Example 3. Bread making tests, dough test and aging retardation test were performed in accordance with method indicated in Embodiment Example 2.

The results are indicated in Table 8.

TABLE 8

| | Bread-Making Test Result | | | |
|---|---|---|---|---|
| Test specimens | Dough test | Aging retardation effect kg/10mm | | |
| | | 1st day | 2nd day | 3rd day |
| Experimental No. 41 Comparative example | o | 0.82 | 1.22 | 1.32 |
| Experimental No. 44 Embodiment example | o | 0.80 | 1.14 | 1.27 |
| Experimental No. 51 Embodiment example | o | 0.80 | 1.14 | 1.28 |
| Experimental No. 58 Embodiment example | o | 0.81 | 1.16 | 1.30 |
| Experimental No. 64 Embodiment example | o | 0.81 | 1.15 | 1.28 |
| Blank | x | 1.08 | 1.55 | 1.65 |
| Commercially* available emulsifier (for comparison) | o | 0.76 | 1.16 | 1.27 |

*Commercially available Emulsy - MM-100 (manufactured by Riken Vitamin), including 80% of monoglyceride in powder form.

The compositions of this invention are all excellent in both dough test and aging retardation effect.

What is claimed is:

1. An emulsifier composition for use in starch containing food which is prepared by melt mixing 80–95% of a distilled monoglyceride composition comprising 65–85% of saturated fatty acid monoglycerides and 35–15% of unsaturated fatty acid monoglycerides and having an iodine value of 10–40, with 20–5% of fats having a melting point of more than 45° C., powdering the resultant mixture and thereafter tempering the powdered composition for more than 30 minutes at a temperature above 45° C. and which does not melt the powdered composition.

2. An emulsifier composition for use in starch containing food which is prepared by melt mixing 80–95% of a distilled monoglyceride composition comprising 65–85% of saturated fatty acid monoglycerides and 35–15% of unsaturated fatty acid monoglycerides and having an iodine value of 10–40, with 20–5% of fats having a melting point of more than 45° C. and less than 5% of a member selected from the group consisting of alcohols, organic acids, lecithin and stearoyl lactylate, powdering the resultant mixture and thereafter tempering the powdered composition for more than 30 minutes at a temperature above 45° C. and which does not melt the powdered composition.

3. The emulsifier composition according to claim 2 or claim 1 wherein the alcohol is selected from the group consisting of propylene glycol and glycerol; the organic acid is selected from the group consisting of citric acid, malic acid, fumaric acid, succinic acid, glutamic acid, tartaric acid and lactic acid; the lecithin is selected from the group consisting of soybean lecithin and egg yolk lecithin and the stearoyl lactylate is selected from the group consisting of lactylic stearate, sodium stearoyl-2-lactylate and calcium stearoyl-2-lactylate.

4. A method of improving the quality of starch containing food which comprises adding to the food or to a preparative component thereof an emulsifier composition according to any of claims 1, 2 or 3.

* * * * *